United States Patent
Terschluse

Patent Number: 6,118,857
Date of Patent: Sep. 12, 2000

[54] MODEM

[75] Inventor: Markus Terschluse, München, Germany

[73] Assignee: Siemens Aktiengesellschaft, Munich, Germany

[21] Appl. No.: 09/138,975

[22] Filed: Aug. 24, 1998

[30] Foreign Application Priority Data

Aug. 22, 1997 [DE] Germany ............ 197 36 648

[51] Int. Cl.$^7$ ............................................. H04M 11/00
[52] U.S. Cl. ................................. 379/93.35; 379/93.09; 379/142
[58] Field of Search ........................... 379/93.35, 93.23, 379/93.09, 142

[56] References Cited

U.S. PATENT DOCUMENTS

| | | |
|---|---|---|
| 3,644,830 | 2/1972 | Ragsdale . |
| 4,995,074 | 2/1991 | Goldman et al. . |
| 5,287,401 | 2/1994 | Lin . |
| 5,493,609 | 2/1996 | Winseck, Jr. et al. . |
| 5,513,251 | 4/1996 | Rochkind et al. . |
| 5,519,767 | 5/1996 | O'Horo et al. . |
| 5,930,347 | 7/1999 | Louvel ............... 379/93.35 |

FOREIGN PATENT DOCUMENTS

| | | |
|---|---|---|
| 2138565 | 6/1996 | Canada . |
| 0 776 119 A2 | 5/1997 | European Pat. Off. . |

OTHER PUBLICATIONS

International Patent Application WO 96/02104 (Winseck et al.), dated Jan. 25, 1996.
International mPatent Application WO 97/37483 (Foladare et al.), dated Oct. 9, 1997.
Published International Application No. 96/02104 (Winseck et al.), dated Jan. 25, 1996.

*Primary Examiner*—Stella Woo
*Attorney, Agent, or Firm*—Herbert L. Lerner; Laurence A. Greenberg; Werner H. Stemer

[57] ABSTRACT

The data transmission apparatus has a subscriber connection for a telephone subscriber line and a data connection for connection to a computer. A modulator section converts the digital data received from the computer into a transmission signal which is suitable for transmission via the telephone subscriber line. A demodulator section converts the signal received from the telephone subscriber line into a digital data stream. The data transmission apparatus has a device for detecting a special signal that is contained in the received signal at times. The special signal may be, in particular, a call-waiting signal injected into the subscriber line at an exchange while a call is waiting.

12 Claims, 1 Drawing Sheet

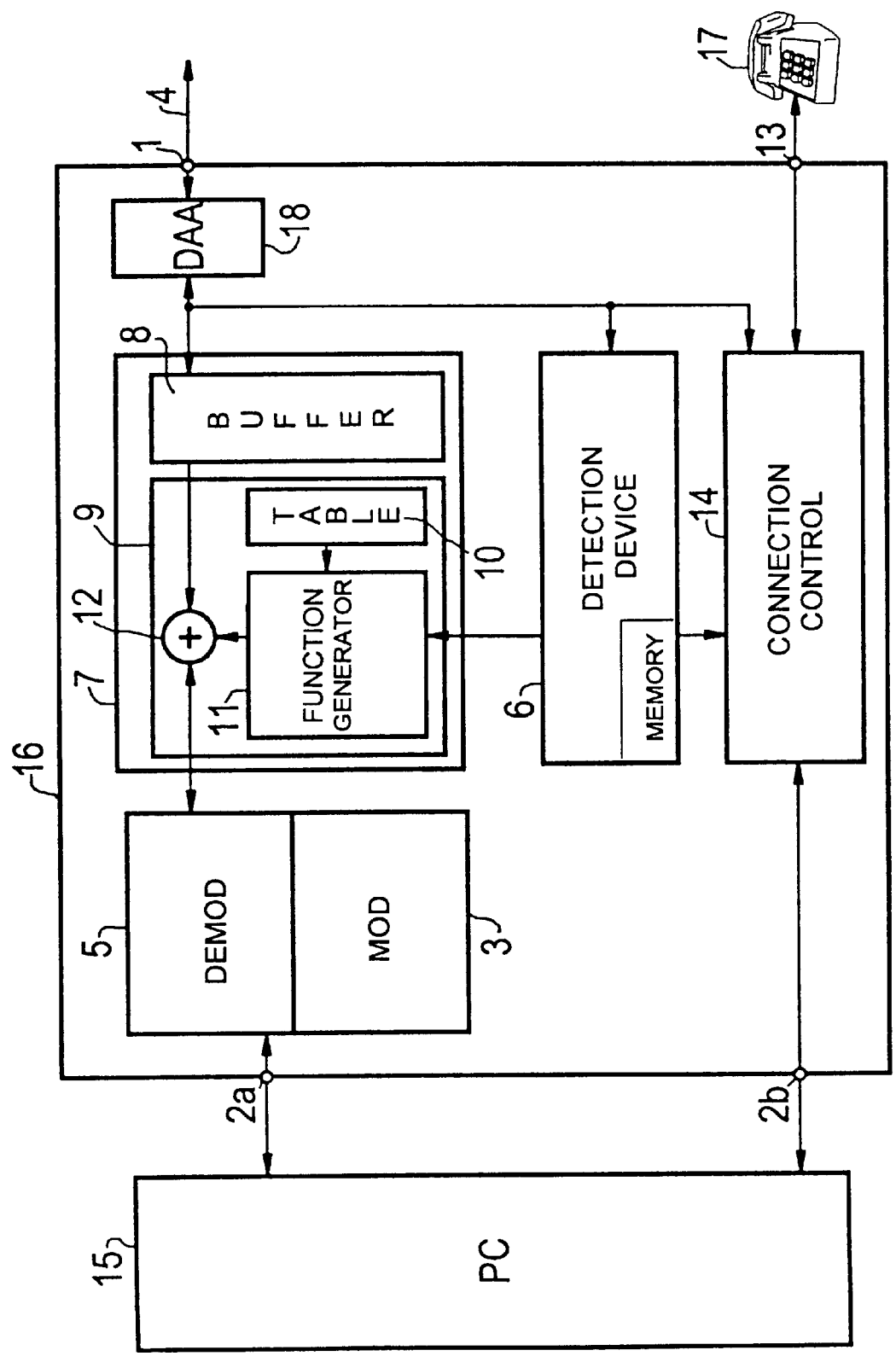

MODEM

BACKGROUND OF THE INVENTION

FIELD OF THE INVENTION

The invention relates to a data transmission apparatus with a subscriber connection for a telephone line of a telephone network, a data connection for connection to a computer, a demodulator section for converting an input signal received from the telephone line into digital data which are transmitted to the computer, and a signal detection device for detecting a special signal contained in the received signal at times, which special signal is produced by a telephone network exchange.

Data transmission apparatuses by means of which a computer can be connected via a conventional telephone line to another computer are normally called modems. Such modems are frequently used in conjunction with PCs. The modems render it possible for the PC to set up a connection via a conventional telephone network to another computer or to a network of computers. That "host" computer or network is also connected to the telephone network. It is not rare for such connections between a user's PC and a data network, such as the Internet, to last over lengthy time periods. Due to the fact that PC users—particularly in private use—often have only one telephone line that is used both for conventional voice communication and for data communication through the computer modem, the user is not available for incoming voice calls while a data session is taking place.

U.S. Pat. No. 5,493,609 to Winseck, Jr. et al. discloses a telecommunication system for automatically switching between voice and data communications. There, dynamic switching is possible on a conventional telephone line, between a voice mode and a multiplicity of data modes. In the basic mode, voice operation takes place between two subscribers. When one subscriber sends a start signal, the voice operation is ended and the system changes over to data mode.

Modern telephone switching systems offer the telephone subscriber a "call waiting" feature. If the feature is activated, an audible signal is inserted for the subscriber while the telephone call is taking place. The signal indicates to the subscriber that a further call has been received at the exchange. The subscriber then has the option of signaling to the exchange whether he wishes to terminate or interrupt the existing call in order to receive the waiting call ("flash"), or whether he wishes to continue with the current call. The presence of a waiting call is indicated to the subscriber by adding an audio signal to the call signal coming from the exchange, which the subscriber receives acoustically while the call is taking place.

If the existing connection is a data communication through a modem, then it is not possible for the PC user to perceive the "audible" call-waiting signal in the incoming signal sent from the exchange to the modem. In fact, there is even a risk that the call-waiting signal added to the received signal may cause errors in the demodulation of the received signal. Often, this leads to the termination of the data connection by the driver software or by the communications software driving the modem. There is thus a desire by data communications users to be able to receive a telephone call even while a data communication is taking place, without the data communication being unnecessarily adversely affected by this.

U.S. Pat. No. 5,519,767 to O'Horo et al. discloses a voice and data modem with the "call waiting" function. While that modem can identify a call waiting signal, it ignores the signal in the subsequent data processing in the modem.

SUMMARY OF THE INVENTION

It is accordingly an object of the invention to provide a modem, which overcomes the above-mentioned disadvantages of the prior art devices and methods of this general type and which takes account of special signals, which are added to a telephone subscriber line at times, while data communication is taking place on the subscriber line.

With the foregoing and other objects in view there is provided, in accordance with the invention, a data transmission apparatus, comprising:

a subscriber connection for a telephone subscriber line of a telephone network;

a data connection for connection to a computer;

a demodulator section connected between the subscriber connection and the data connection for converting a received signal received from the telephone subscriber line into digital data to be transmitted to the computer through the data connection;

a signal detection device connected to the subscriber connection for detecting a special signal contained in the received signal; and a compensation device connected between the subscriber connection and the demodulator section for substantially removing the special signal from the received signal on detection of the special signal.

The special signal is produced by the telephone network exchange and it is contained in the received signal at times. The special signals occur randomly, and at unpredictable times, from the point of view of the data transmission apparatus. Such special signals are added to the received signal in a specific frequency band.

In accordance with an added feature of the invention, the compensation device includes a buffer memory for buffer-storing the received signal, and a device for amplitude and phase adaptation of the buffer-stored received signal, the device for amplitude and phase adaptation, in response to a signal from the signal detection device, removing the special signal from the buffer-stored received signal. In other words, it is particularly advantageous for the signal detection device to have a device which calculates a correlation function. The received signal is thereby correlated with a special signal waveform. In one particularly preferred exemplary embodiment, the device which carries out a correlation function has the memory. The memory is used to store special signal waveforms which can be expected in the course of a telephone connection. In one particularly preferred exemplary embodiment, when a special signal is present, the signal detection device emits a signal which depends on the special signal waveform detected by means of the signal detection device. This has the advantage that different procedures can be adopted, depending on the special signal waveform which arrives.

As noted, the demodulator section of the data transmission apparatus has connected upstream thereof a compensation device which removes the special signal from the received signal once the latter has been detected by the signal detection device. It is particularly preferred for the compensation device to have a buffer memory for buffer-storing the received signal, and a device for amplitude and phase adaptation of the buffer-stored received signal. The device for amplitude and phase adaptation thereby responds to a signal from the signal detection device, in order to remove the special signal from the received signal which is stored in the meantime. In this way, the demodulator is supplied with a signal which does not contain any special signal and which is thus optimally suitable for demodulation. The data sent from the remote terminal to the modem can thus be recovered in the demodulator with greater reliability.

In accordance with an additional feature of the invention, the device for amplitude and phase adaptation includes a table with special signal waveforms to be expected stored therein, a function generator producing a compensation signal from a special signal waveform stored in the table, and a mixing device for linking the buffer-stored received signal to the compensation signal. In a measurement device, the buffer-stored received signal is linked to the compensation signal from the function generator, and this results in a signal which no longer contains the special signal waveform that is being detected at the moment, or still contains it at a substantially reduced power level.

In accordance with another feature of the invention, the special signal contains a call-waiting signal and/or a caller ID signal produced at a telephone exchange.

In accordance with a further feature of the invention, on detecting the special signal, the signal detection device issues a signal that is transmitted to the computer through the data terminal. In the alternative, or in addition, the signal detection device initiates an acoustic signal.

When such a signal is detected, an appropriate signal is preferably transmitted to the computer. Alternatively or in addition to this, an audible signal is initiated when such a special signal is detected. A further special signal waveform is the clock signal by means of which it is possible to drive a charge meter connected at the subscriber end.

In accordance with again an added feature of the invention, the data transmission apparatus further comprises a voice terminal for connecting a voice telephone. On detecting the special signal, the detection device may output a bell signal at the voice terminal.

In accordance with again a further feature of the invention, a connection control device is connected to the detection device for selectively terminating, interrupting, and reconnecting an existing data connection, the connection control device receiving a signal indicating whether the data connection is intended to be interrupted, terminated, or maintained. That signal may be produced by the voice telephone terminal which issues an interruption signal to the connection control device when the telephone handset is lifted off, and issues a reconnection signal when the telephone handset is placed back in the cradle. A telephone which is connected to a data transmission apparatus in this way thus behaves like a conventional telephone when a call-waiting signal is received, with an audible signal indicating that a call is waiting. When the telephone handset is lifted off, the connection control device is signaled that the waiting call should be received, that is to say the data connection should be interrupted. The connection control device then connects the telephone subscriber line through to the telephone which is connected to the data transmission apparatus.

In accordance with a concomitant feature of the invention, on detecting the special signal, the detection device outputs a bell signal at the voice terminal and, when a call is accepted on the voice telephone, the connection control device interrupts the existing data connection, and reconnects the data connection when the voice call is terminated.

Finally, the computer may be equipped with a soundcard and thus have a voice input device and a voice output device. It is thereby possible to pass the waiting telephone call via the voice input and voice output device of the computer. The functions of call acceptance and call ending can be reported to the computer by means of other input devices, such as a keyboard or a mouse. It is in this case particularly preferred for an incoming special signal to be displayed visually on a computer output device, for example the screen. In this case, the functionality must preferably be taken into account by the computer application software. It is in this case particularly preferred for the computer to have a device for echo compensation, as is known in principle in telephone technology.

Other features which are considered as characteristic for the invention are set forth in the appended claims.

Although the invention is illustrated and described herein as embodied in a modem, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a block diagram of a communications system with a preferred data transmission apparatus.

DESCRIPTION OF THE PREFERRED EMBODIMENTS

Referring now to the drawing FIGURE in detail, there is seen a modem 16 which is connected via the connections 2a and 2b to a computer 15. By way of example, the illustrated computer is a type of PC. The modem 16 furthermore has a connection 1 to which a subscriber line 4 of a telephone network is connected. The subscriber connection 1 and the data connections 2 allow signals and data to be interchanged in both directions.

As main components, the modem 16 has a modulator 3 and a demodulator 5. The demodulator 5 receives the signals originating from the subscriber line 4, demodulates them and sends the data obtained from them via the connection 2a to the PC 15. Conversely, the modulator 3 modulates the data coming from the PC 15 and outputs the data via the subscriber connection 1 (the signal path is not shown in detail but is produced in a conventional manner). The modem 16 has at its subscriber connection 1 a converter 18 which converts the analog signals from the subscriber line 4 into a digital representation, and converts into analog signals those signals which are to be output by the modem 16 and are represented digitally. Furthermore, the converter 18 carries out the 2-wire/4-wire conversion. The converter 18 is generally also called a Data Access Arrangement (DAA).

The received signal which is intended for the demodulator 5 is supplied on the one hand to a compensation device 7 and on the other hand to a detection device 6. The detection device detects the presence of a call-waiting signal. When the detection device 6 detects a call-waiting signal, it passes a signal to the compensation device 7, which removes the call-waiting signal that is contained in the received signal. The compensation device 7 then passes the received signal, from which the call-waiting signal has been removed, on to the demodulator for further processing.

The call-waiting signal detection device 6 has a device for carrying out correlation. There, the continuously arriving received signal is correlated with a multiplicity of special signal waveforms which can be expected. Possible signal waveforms are in this case, for example, a call-waiting signal, a caller identification signal (caller ID) or a charge metering clock signal. The special signals have predetermined signal waveforms, which are produced in a telephone network exchange. All the special signal waveforms to be considered are stored in a memory in the detection device 6 and are continuously compared with the received signal. When the correlation device detects the presence of a special signal, then the detection device 6 issues a signal corresponding to the special signal.

The compensation device 7 has a buffer memory 8 in which the received signal is continuously buffer-stored, and is thus delayed. When the detection device 6 detects a specific special signal, a function generator 11 receives a corresponding signal from the detection device 6, whereupon it produces a compensation signal. In a mixing device 12, the received signals which have been delayed in the buffer memory 8 and the compensation signal from the function generator 11 are linked, and this results in a received signal from which the special signal has been removed. The output signal from the mixing device 12 is supplied to the demodulator 5. The function generator 11 produces the compensation signal in that, depending on the detected special signal waveform, it locks up the special signal waveform in a table 10, in order to use this to form the compensation signal. The table 10 thus contains a multiplicity of special signal waveforms which can be expected.

When a special signal is detected, the detection device 6 also issues a signal to a connection controller 14. The connection controller 14 signals, for example, to the PC 15 via the connection 2b and/or to a telephone set 17 via the connection 13 that a call-waiting signal is present. The PC 15 can signal the presence of a call-waiting signal to the user by means of audible or visual signals. Alternatively or at the same time, the conventional voice telephone 17 can be caused to ring by means of a bell signal.

Using such an arrangement it is, for example, possible for a call-waiting signal to arrive while a data connection is taking place, without any disturbance to the data connection at the modem, for the call-waiting signal to be identified as such, and thus for a telephone connected to the modem to be caused to indicate that a call has arrived. The user can then decide whether or not she wishes to accept the call. When the call is accepted, that is to say the telephone handset is lifted off the hook, the connection controller 14 receives a corresponding signal, whereupon it interrupts or parks the data connection (i.e., the logic data connection is maintained, but the data flow in both directions is temporarily stopped) and switches through the telephone subscriber line 4 to the telephone 17. When the call ends, the data connection can be reconnected. As an alternative to this, the user can signal via the PC 15 that she wishes to end the data connection and not have it reconnected, in order to accept the waiting telephone call. The switching between the data connection and the telephone call is carried out by means of the connection controller 14, which signals the respective connection request to the exchange via the subscriber line 4, by means of appropriate signaling. This is done by means of DTMF signaling (Dual-Tone Multiple Frequency).

Alternatively, a sound card can be provided in the PC 15, which allows voice input to and voice output from the computer. It is then unnecessary to provide a separate telephone set 17, since the waiting telephone call can be carried via the voice input and voice output device of the PC 15. The call acceptance and call end are then signaled via the conventional input devices of the PC 15, such as a keyboard or a mouse. In the process, the PC 15 runs software which carries out echo compensation.

Using such a system, it is possible for the subscriber having an analog telephone connection to remain accessible by telephone during a data connection. This is particularly important since data connections often last for a very long time, and the subscriber is inaccessible by telephone during that time. By automatic identification of a call-waiting signal in the modem, the application software can make the subscriber aware that a call is waiting. The user can then accept the call either via a conventional voice telephone connected to the modem or via computer voice input and voice output devices. Depending on what the subscriber does, a connection controller signals to the exchange how the existing data connection should be handled. It is either terminated or merely interrupted, in order to be reconnected once the call has ended. If the exchange transmits a caller identification (caller ID), that is to say the subscriber number and name of the calling party, then the subscriber number/name can also be indicated, either on the PC 15, on the telephone set 17, or on a separate caller ID box.

The compensation device 7 allows the special signals which are added to the received signal to be extracted before they are supplied to the demodulator 5. A multiplicity of special signal waveforms which can be expected can be taken into account in a table in the detection device 6 and a table in the compensation device 7. In particular, different signal waveforms of the call-waiting signal from different telephone network operators can also be taken into account.

I claim:

1. A data transmission apparatus, comprising:
    a subscriber connection for a telephone subscriber line of a telephone network;
    a data connection for connection to a computer;
    a demodulator section connected between said subscriber connection and said data connection for converting a received signal received from the telephone subscriber line into digital data to be transmitted to the computer through said data connection;
    a signal detection device connected to said subscriber connection for detecting a special signal contained in the received signal; and
    a compensation device connected between said subscriber connection and said demodulator section for substantially removing the special signal from the received signal on detection of the special signal, said compensation device including a buffer memory for buffer-storing the received signal resulting in a buffer-stored received signal and a device for amplitude and phase adaptation of the buffer-stored received signal, said device for amplitude and phase adaptation removing the special signal from the buffer-stored received signal in response to a signal from said signal detection device, said device for amplitude and phase adaptation has a table with special signal waveforms to be expected stored therein, a function generator producing a compensation signal from a special signal waveform stored in said table, and a mixing device for linking the buffer-stored received signal to the compensation signal.

2. The data transmission apparatus according to claim 1, wherein the special signal contains a call-waiting signal produced at a telephone exchange.

3. The data transmission apparatus according to claim 2, wherein, on detecting the special signal, said signal detection device issues a signal that is transmitted to the computer through said data terminal.

4. The data transmission apparatus according to claim 2, wherein, on detecting the special signal, said signal detection device initiates an acoustic signal.

5. The data transmission apparatus according to claim 2, which further comprises a voice terminal for connecting a voice telephone, and wherein, on detecting the special signal, said detection device outputs a bell signal at said voice terminal.

6. The data transmission apparatus according to claim 1, wherein the special signal contains a caller ID produced at a telephone exchange.

7. The data transmission apparatus according to claim 6, wherein, on detecting the special signal, said signal detection device issues a signal that is transmitted to the computer through said data terminal.

8. The data transmission apparatus according to claim 6, wherein, on detecting the special signal, said signal detection device initiates an acoustic signal.

9. The data transmission apparatus according to claim 6, which further comprises a voice terminal for connecting a voice telephone, and wherein, on detecting the special signal, said detection device outputs a bell signal at said voice terminal.

10. The data transmission apparatus according to claim 1, which further comprises a voice terminal for connecting a voice telephone.

11. The data transmission apparatus according to claim 1, which further comprises a connection control device connected to said detection device for selectively terminating, interrupting, and reconnecting an existing data connection, said connection control device receiving a signal indicating whether the data connection is intended to be interrupted, terminated, or maintained.

12. The data transmission apparatus according to claim 1, which further comprises a voice terminal for connecting a voice telephone and a connection control device connected to said detection device and to said voice terminal, and wherein, on detecting the special signal, said detection device outputs a bell signal at said voice terminal and, when a call is accepted on the voice telephone, said connection control device interrupts the existing data connection, and reconnects the data connection when the voice call is terminated.

* * * * *